United States Patent [19]

Rittler

[11] 3,854,963
[45] Dec. 17, 1974

[54] AGCL-NUCLEATED GLASS-CERAMIC ARTICLES

[75] Inventor: Hermann L. Rittler, Horseheads, N.Y.

[73] Assignee: Corning Glass Works, Corning, N.Y.

[22] Filed: May 11, 1973

[21] Appl. No.: 359,431

[52] U.S. Cl.................... 106/39.6, 65/33, 106/52
[51] Int. Cl............................................. C03c 3/22
[58] Field of Search ............... 106/39.6, 39.8; 65/33

[56] References Cited
UNITED STATES PATENTS 3,282,711 11/1966 Lin.................................... 106/39.6
3,681,097 8/1972 Beall.................................. 106/39.6

*Primary Examiner*—Helen M. McCarthy
*Attorney, Agent, or Firm*—Clarence R. Patty, Jr.; Clinton S. Janes, Jr.

[57] ABSTRACT

This invention relates to the production of glassceramic articles which exhibit a coefficient of thermal expansion of between about $0-25 \times 10^{-7}/°C$. over the temperature range of 25°–900°C. and which further exhibit a dense, white opacity when viewed in cross sections as thin as ⅛ inch. These articles are substantially free from the alkali metal oxides and the alkaline earth metal oxides with compositions with a narrowly-defined area of the $ZnO-Al_2O_3-SiO_2$ field nucleated with AgCl.

5 Claims, No Drawings

AGCL-NUCLEATED GLASS-CERAMIC ARTICLES

The production of glass-ceramic articles basically involves the crystallization in situ of glass articles through the application of controlled heat treatments thereon. The process of formation utilizes three general steps. First, a glass-forming batch commonly containing a nucleating agent is melted. Thereafter, this melt is simultaneously cooled to a glass and an article of desired dimensions shaped therefrom. Finally, that glass article is exposed to a predetermined firing schedule with the result that the glass is crystallized in situ yielding a body composed of relatively uniformly-sized, fine-grained crystals homogeneously dispersed within a residual glassy matrix. In the conventional practice, this last step will consist of two parts. The article will initially be heated to a temperature within or slightly above the transformation range of the glass to cause the development of nuclei therein. Subsequently, the article will be subjected to a temperature approaching or exceeding the softening point of the glass to promote the growth of crystals on those nuclei.

This mechanism of crystallization in situ provides a crystalline article that is free from voids and non-porous. And, normally, the crystallinity developed will be greater than 50% by weight of the article. This latter factor exerts a highly significant effect upon the chemical and physical properties of the article. Thus, the predominantly crystalline character of the bodies results in their behavior more closely approaching that of the crystal phase than that of the parent glass. Also, of course, the residual glassy matrix will not only be small in amount but will have a composition differing substantially from that of the original or parent glass since the constituents comprising the crystal glass will have been precipitated therefrom.

U.S. Pat. No. 2,920,971, the basic patent in the field of glass-ceramic manufacture, provides an extensive discussion of the theoretical considerations and practical aspects to be observed in the production thereof and reference is made thereto for further understanding of the general concepts involved.

U.S. Pat. No. 3,681,097 discloses the production of glass-ceramic articles having compositions within the $ZnO-Al_2O_3-SiO_2$ field nucleated with $ZrO_2$ and/or the noble metals wherein zinc petalite solid solution and/or beta-quartz solid solution constitute the predominant crystal phases. That patent explains that the crystals were termed zinc petalite since the X-ray diffraction pattern observed therein very closely approximated that exhibited by petalite ($LiAlSi_4O_{10}$). It is believed that the crystals probably comprise a solid solution phase composed of some combination of $ZnAl_2Si_3O_{10}$, $ZnSi_2O_5$, and $ZnAl_2Si_8O_{20}$ which are zinc analogs of petalite.

The crystalline bodies obtained following that invention demonstrated coefficients of thermal expansion over the temperature range of 25°–600°C. from about $-5 \times 10^{-7}$/°C. up to about $+20 \times 10^{-7}$/°C. and, while being opaque, frequently did not exhibit the extremely high density of crystallization required to produce a fully opaque body in cross sections as thin as ⅛ inch. Furthermore, in a considerable number of instances, the final products did not demonstrate a deep white color but, instead, a brownish or grayish hue. Particularly were these off-white colors evidenced where the noble metals were employed as nucleating agents. Yet, because of the high efficiency of the noble metals as nucleating agents, relatively minuscule amounts were effective in yielding very highly crystalline, fine-grained bodies. As a result, fuller use of the zinc petalite and/or beta-quartz solid solution phases could be enjoyed since there would be essentially no dilution resulting from the presence of a nucleating component.

Therefore, although the glass-ceramic articles produced through U.S. Pat. No. 3,681,097 possess very useful properties, there has been a need for glass-ceramic articles which would demonstrate similar coefficients of thermal expansion over a wide range of temperatures thereby providing them with a wide range of practical utility. A further useful property would be dense white opacity even in very thin cross sections.

U.S. application Ser. No. 359,432 filed concurrently herewith by the present inventor, relates to the production of zero expansion, densely-white glass-ceramic articles having base glass compositions narrowly circumscribed within the broad ranges disclosed in U.S. Pat. No. 3,681,097, but wherein $ZrO_2$ is the nucleating agent and $Ta_2O_5$ is added in specifically defined amounts.

The present invention provides glass-ceramic articles, wherein the crystal content consists essentially of zinc petalite and/or beta-quartz solid solution (s.s.) exhibiting coefficients of thermal expansion between about $0-25 \times 10^{-7}$/°C. over the broad temperature range of 25°–900°C. with extremely deep white opacity in cross sections as thin as ⅛ inch. The invention is founded upon the utilization of AgCl as the sole nucleating agent for a very narrow range of compositions within the $ZnO-Al_2O_3-SiO_2$ field.

The basic method steps comprising the invention are three. First, a batch for a glass consisting essentially, by weight on the oxide basis, of about 10–20% ZnO, 10–20% $Al_2O_3$, 50–75% $SiO_2$, and at least an effective amount of AgCl to nucleate the crystal phases is melted. The base glass ingredients, themselves, can be the metal oxides or any other materials which, when melted together, will be converted to the desired metal oxides in the proper proportions. Second, the melt is simultaneously cooled to at least within the transformation range thereof and a glass article shaped therefrom. The transformation range is that temperature at which a liquid melt is considered to have been transformed into an amorphous solid, this temperature conventionally being deemed as lying in the vicinity of the annealing point of the glass. Third, the glass article is exposed to a temperature above the transformation range for a period of time sufficient to cause the desired crystallization in situ, the range of effective crystallization temperatures commonly varying between about 775°–950°C.

Since the rate at which crystallization will occur is directly dependent upon the temperature employed therefor, a short exposure time, e.g., one hour or less, can be sufficient to secure very dense crystallization at temperatures within the higher extreme of the crystallization range. Conversely, much longer exposure times, e.g., up to 24–48 hours, may be demanded to achieve a like degree of crystallization density when temperatures within the cooler extreme of the crystallization range are utilized.

The use of crystallization temperatures in excess of 950°C. is normally avoided inasmuch as the zinc petalite and beta-quartz solid solutions are prone to become unstable and be transformed into gahnite ($ZnO \cdot Al_2O_3$), willemite ($2ZnO \cdot SiO_2$), and/or cristobalite ($SiO_2$) at those temperatures. These latter phases have high coefficients of thermal expansion which will obviously militate against the possibility of securing a zero expansion product. Therefore, whereas a minor growth of those crystal phases may take place at temperatures within the 775°–950°C. range, the total developed therein is so small as to exert a negligible effect only upon the overall properties of the final article.

Crystallization temperatures below about 775°C. are normally not employed since the rate of crystal growth is generally so slow as to be unattractive from a practical point of view.

The preferred crystallization heat treatment contemplates two steps. First, the glass article is exposed to a temperature slightly above the transformation range, e.g., 725°–800°C., for a length of time sufficient to cause extensive nucleation within the glass and initiate crystal growth. Second, the nucleated article is subjected to a temperature within a 800°–950°C. range for a time adequate to secure essentially complete crystallization. In general, a dwell time of about 2–6 hours within the nucleation range followed by a dwell time of about 1–8 hours within the crystallization range will yield very highly crystalline bodies demonstrating the desired deep white opacity in thin sections.

The final bodies of the instant invention are very densely crystallized, being greater than 75% by weight crystalline and, preferably, in excess of 90% by weight crystalline. The crystals are homogeneously dispersed within the minor residual glassy matrix and are quite uniform in size, i.e., generally not exceeding about one micron in diameter and, preferably, not exceeding about 0.5 microns.

Many variations in the steps of production are possible. Three of these are set out in the paragraphs immediately below.

First, after the molten batch has been cooled to at least within the transformation range and a glass article of a predetermined configuration shaped therefrom, that article can then be either further cooled to room temperature to allow for visual inspection of glass quality prior to initiating the crystallization heat treatment or, if speed in production is of paramount importance, the melt can merely be quenched to a glass article at a temperature approximating or immediately below the transformation range and the article reheated at once into the crystallization temperature range.

Second, whereas the preferred crystallization embodiment involves a two-step heat treatment process utilizing separate nucleation and crystallization ranges, satisfactorily crystallized bodies can be obtained where the glass article is simply heated from room temperature or immediately below the transformation range to a temperature between about 775°–950°C. and held within those temperatures for a sufficient length of time to secure a highly crystalline body. Nevertheless, articles produced in that manner will normally not contain crystals which will be as uniformly fine-grained as can be achieved through the two-step procedure.

Third, whereas specific dwell periods at various specific temperatures are commonly employed as a convenience in production, that practice is not required for satisfactory crystal growth. Thus, it is only necessary that the glass article be held within the 775°–950°C. crystallization range for a sufficient period of time to insure extensive crystal growth.

As was noted above, the growth of the crystals is directly dependent upon time and temperature. Therefore, the rate at which the glass article is heated above its transformation range must be controlled to avoid exceeding the rate of crystal growth. Hence, the crystal growth should be adequate to support the article or deformation and slumping of the body can occur as the softening point of the glass body is approached. Heating rates of 10°C./minute can be employed successfully, particularly where some physical supporting members such as former or setters are present to inhibit deformation of the glass bodies, but heating rates of about 3°–5°C./minute have been found to be about universally acceptable. Thus, these latter heating rates have yielded crystallized articles demonstrating little, if any, physical deformation over the entire composition range comprising the invention.

Table I records compositions, expressed in weight percent on the oxide basis, of thermally crystallizable glasses which can be heat treated in accordance with the process steps of the instant invention. The batch ingredients are compounded, ballmilled together to aid in achieving a homogeneous melt, and then melted in open platinum crucibles for about 16 hours at temperatures ranging between about 1,500°–1,600°C. Glass cane samples having a diameter of about ¼ inch are hand drawn from each crucible and the remainder of each melt poured onto a steel plate to produce a circular glass patty about 5 inch in diameter and ½ inch in thickness. The glass articles are transferred immediately to an annealer operating at 650°C.

After removal from the annealer, the articles are visually inspected for glass quality and then positioned within the electrically fired furnace for exposure to the heat treating schedules set forth in Table II. Upon completing each schedule, the crystallized articles are either withdrawn directly from the furnace into the ambient atmosphere or, for convenience, simply left within the furnace, the electric current thereto cut off, and the articles permitted to cool to room temperature therein. This latter practice, termed cooling at furnace rate, was estimated to average about 3°–5°C./minute.

The glass compositions recited in Table I are illustrative of the need for maintaining the quantities of ZnO, $Al_2O_3$ and $SiO_2$ within the above-described ranges in order to produce the desired low expansion glass-ceramic articles demonstrating a densely-white opacity even in cross sections as thin as ⅛ inch. AgCl must be present in an amount effective to nucleate the crystal phases. In general, at least about 0.1% by weight has been found necessary to insure sufficient nucleation to result in a uniformly fine-grained body after heat treatment. Smaller amounts can be employed but usually the crystallization resulting therefrom will be coarser than preferred. Although quantities of AgCl in excess of 1% by weight will prove effective in nucleating a densely crystalline body, such amounts are not attractive economically and merely serve to dilute the desired zinc petalite/betaquartz solid solution phase. Therefore, about 1% by weight AgCl has been deemed a practical maximum.

$As_2O_3$ was included in several of the compositions in its conventional role as a firing agent.

TABLE I

|        | 1     | 2     | 3     | 4     | 5     | 6     | 7     | 8     |
|--------|-------|-------|-------|-------|-------|-------|-------|-------|
| $SiO_2$  | 65.8% | 66.8% | 65.2% | 68.8% | 62.2% | 58.2% | 69.0% | 68.5% |
| $Al_2O_3$ | 18.1  | 17.2  | 19.6  | 17.0  | 17.0  | 17.0  | 14.1  | 16.4  |
| ZnO    | 14.9  | 15.2  | 15.0  | 13.0  | 15.0  | 14.0  | 10.5  | 12.3  |
| AgCl   | 0.6   | 0.2   | 0.2   | 0.2   | 0.2   | 0.2   | 0.2   | 0.2   |
| $As_2O_3$ | 0.6   | 0.6   | —     | 1.0   | 0.6   | 0.6   | 0.5   | 0.6   |
| $Ta_2O_5$ | —     | —     | —     | —     | 5.0   | 10.0  | —     | —     |
| $AlCl_3$  | —     | —     | —     | —     | —     | —     | 5.7   | —     |
| $P_2O_5$  | —     | —     | —     | —     | —     | —     | —     | 2.0   |

|        | 9     | 10    | 11    | 12    | 13    | 14    |
|--------|-------|-------|-------|-------|-------|-------|
| $SiO_2$  | 60.7% | 66.0% | 67.2% | 65.6% | 65.6% | 65.6% |
| $Al_2O_3$ | 18.1  | 19.9  | 17.0  | 18.2  | 18.2  | 18.2  |
| ZnO    | 14.9  | 13.1  | 15.0  | 15.0  | 15.0  | 15.0  |
| AgCl   | 0.6   | 0.4   | —     | —     | —     | —     |
| $As_2O_3$ | 0.6   | 0.6   | 0.6   | 0.6   | 0.6   | 0.6   |
| $Ta_2O_5$ | 5.1   | —     | —     | —     | —     | —     |
| Ag     | —     | —     | 0.2   | —     | —     | —     |
| $AgNO_3$ | —     | —     | —     | 0.6   | —     | —     |
| $Ag_2O$  | —     | —     | —     | —     | 0.6   | —     |
| $Ag_2SO_4$ | —   | —     | —     | —     | —     | 0.6   |

Table II records a particular heat treatment schedule utilized in developing the crystal phase in each glass article along with a visual description of the final body, a measurement of the coefficient of thermal expansion of the crystallized articles observed over the range 25°–900°C. ($\times 10^{-7}$/°C.), and an identification of the crystal phases present as determined through X-ray diffraction analysis. In each of the recited heat treatment schedules, the temperature was raised at a rate about 5°C./minute to the listed dwell temperature and the crystallized articles permitted to cool to room temperature at furnace rate.

TABLE II

| Example No. | Heat Treatment | Visual Description | Major Crystal Phases | Exp. Coeff. |
|---|---|---|---|---|
| 1 | Heat to 75°C. Hold for 4 hours Heat to 900°C. Cool to room temp. | Dense white opaque | Zinc petalite s.s., Beta-quartz s.s. | 0.3 |
| 2 | Heat to 875°C. Hold for 30 minuts Cool to 850°C. Hold for 6 hours Cool to room temp. | Dense white opaque | Zinc petalite s.s., Beta-quartz s.s. | 13.7 |
| 3 | Heat to 875°C. Hold for 30 minutes Cool to 850°C. Hold for 12 hours Cool to room temp. | Dense white opaque | Zinc petalite s.s., Beta-quartz s.s. | 13.4 |
| 4 | Heat to 900°C. Hold for 4 hours Cool to 850°C. Hold for 6 hours Cool to room temp. | Dense white opaque | Zinc petalite s.s., Beta-quartz s.s. | 19.4 |
| 5 | Heat to 750°C. Hold for 4 hours Heat to 850°C. Hold for 6 hours Cool to room temp. | Dense white opaque | Zinc petalite s.s., Beta-quartz s.s. | 21.7 |
| 6 | Heat to 850°C. Hold for 30 minutes Cool to room temp. Heat to 850°C. Hold for 6 hours Cool to room temp. | Dense white opaque | Zinc petalite s.s., Beta-quartz s.s. | 21.4 |
| 7 | Heat to 950°C. Hold for 30 minutees Cool to 850°C. Hold for 12 hours Cool to room temp. | Dense white opaque | Zinc petalite s.s., Beta-quartz s.s. | 13.0 |
| 8 | Heat to 900°C. Hold for 4 hours Cool to 850°C. Hold for 6 hours Cool to room temp. | Dense white opaque | Zinc petalite s.s., Beta-quartz s.s. | 8.0 |
| 9 | Heat to 900°C. Hold for 30 minutes Cool to 850°C. Hold for 6 hours Cool to room temp. Heat to 850°C. Hold for 6 hours Cool to room temp. | Dense white opaque | Zinc petalite s.s., Beta-quartz s.s. | 13.0 |

TABLE II — Continued

| Example No. | Heat Treatment | Visual Description | Major Crystal Phases | Exp. Coeff. |
|---|---|---|---|---|
| 10 | Heat to 850°C. Hold for 6 hours Cool to room temp. | Dense white opaque | Zinc petalite s.s., Beta-quartz s.s. | 5.6 |
| 11 | Heat to 950°C. Hold for 30 minutes Cool to 850°C. Hold for 6 hours Cool to room temp. | Gray opaque, opacity not uniform | Zinc petalite s.s., Beta-quartz s.s. | 25.1 |
| 12 | Heat to 750°C. Hold for 4 hours Cool to room temp. Heat to 850°C. Cool to room temp. Heat to 900°C. Cool to room temp. | Brown opaque, opacity not uniform | Zinc petalite s.s., Beta-quartz s.s. | |
| 13 | Heat to 750°C. Hold for 4 hours Heat to 850°C. Hold for 4 hours Cool to room temp. | Gray opaque, opacity not uniform | Zinc petalite s.s., Beta-quartz s.s. | |
| 14 | Heat to 750°C. Hold for 4 hours Heat to 850°C. Hold for 4 hours Cool to room temp. | Gray opaque, opacity not uniform | Zinc petalite s.s., Beta-quartz s.s. | |

A study of Table II in conjunction with Table I clearly illustrates the critical compositional parameters which must be observed to successfully produce the desired crystallized body. In particular, the criticality of employing AgCl as the nucleating ingredient is evident from a comparison of Examples 1–10 with Examples 11–14. Thus, although metallic silver and such silver-containing compounds as $AgNO_3$, $Ag_2CO_3$, $Ag_2SO_4$, $Ag_2O$, etc. will insure the incorporation of silver within the glass composition, the crystallized products demonstrate a colored, rather than a pure white, appearance. The other silver halides do not exhibit the efficiency of nucleation displayed by AgCl and have two other disadvantages with respect thereto: (1) higher cost; and (2) greater volatilization during the melting of the batch.

This unique behavior of AgCl in nucleating a densely-opaque, white body is not fully understood. It is assumed that the oxidation state of the silver is involved but in what manner has not been resolved. Merely maintaining oxidizing conditions during the process steps cannot prove a complete answer inasmuch as similar environments have been provided with the other silver compounds.

The tables also illustrate the need for maintaining the ZnO and $Al_2O_3$ within the ranges set forth above to achieve the required coefficient of thermal expansion. Silica comprises the primary network or glass forming constituent and is included in such amounts as to serve that purpose and to provide the proper stoichiometry for the crystal phase. Hence, the quantity employed is dependent upon the amount of ZnO and $Al_2O_3$ present. Commonly, the $SiO_2$ incorporated will be slightly in excess of that demanded for strict stoichiometry. This practice, of course, is readily understandable inasmuch as the crystal phases developed are solid solutions of varying stoichiometrics.

Whereas, in general, the preferred base glass composition will consist essentially solely of ZnO, $Al_2O_3$, and $SiO_2$ such that a substantially zero expansion crystallized body can be secured, the presence of minor amounts of certain compatible metal oxides may be useful for such purposes as melting aids or modifiers of the chemical and/or physical properties of the final body. The total of all such additions will not exceed about 10% by weight and, preferably, will be maintained below about 5% by weight. Additions of individual ingredients ought preferably to be held below about 5% by weight.

$P_2O_5$ can act as a glass former and a flux but in the present compositions has the further useful property of insuring excellent whiteness in the crystallized product. Therefore, the inclusion of up to about 3% $P_2O_5$ is often very desirable. PbO and $B_2O_3$ demonstrate fluxing properties and BeO causes a lowering of the liquidus of the melt and improving the surface character of the final product. The sum of these four additions will normally not exceed about 5% by weight with the amount of BeO being maintained below about 3% by weight.

The alkali metal oxides, particularly $Li_2O$, $Na_2O$ and $K_2O$, will desirably be absent from the compositions due to their adverse effect upon the dielectric properties of the crystallized products. Also, those oxides tend to cause a rise in the coefficient of thermal expansion. Therefore, although very useful as fluxes, no more than about 2% by weight total can be tolerated even for that capability.

Likewise, the preferred compositions will be essentially free from the alkaline earth metal oxides, especially MgO, CaO, and SrO. These ingredients tend to form solid solutions with the zinc petalite and/or beta-quartz phases which exhibit higher coefficients of thermal expansion or may even result in the growth of such undesirable additional crystal phases as spinel (MgO·$Al_2O_3$) which are high in expansion. Hence, the total amount of those three metal oxides ought to be held below about 3% by weight with individual additions not exceeding about 2% by weight. Barium, the remainder alkaline earth metal, being heavier and less mobile than magnesium, calcium, and strontium does not react as readily chemically as the latter three elements. Therefore, its tendency to form solid solutions or new crystal phases is much less pronounced. Nevertheless, the inclusion of BaO does not appear to improve the character of the final product but does dilute the overall properties of the crystallized body. This situation has forestalled the use of BaO in quantities exceeding about 5% by weight.

ZrO$_2$ can be included as a supplemental nucleating agent but its inclusion is superfluous. The presence of ZrO$_2$ commonly requires higher temperatures to achieve homogeneous melting and can lead to ZrO$_2$ crystals in the final product. Hence, the preferred compositions are essentially free from ZrO$_2$ since the absence of ZrO$_2$ permits these glass compositions to be melted at temperatures at least 50°C. lower than batches containing ZrO$_2$.

TiO$_2$ is a very efficient nucleating agent for the compositions of the invention but its presence is not desirable for at least three reasons. In the first place, its inclusion gives rise to the growth of gahnite, which phase has a high coefficient of thermal expansion. Secondly, its presence frequently leads to a crystallized body having a yellow or brown cast rather than the white sought. Third, its inclusion can result in the presence of TiO$_2$ crystals in the final product. Therefore, the preferred glasses will be free from TiO$_2$ although amounts not exceeding 2% by weight may be tolerated.

It is believed that Tables I and II clearly illustrate the compositional and process parameters which must be observed to achieve a very densely-opaque, white body having a coefficient of thermal expansion over the broad range of 25°–900°C. of between about 0–25 × 10$^{-7}$/°C. which is the result of a highly crystalline, fine-grained microstructure. Example 1, when subjected to the crystallization heat treatment schedule recorded therefor in Table II, comprises the preferred embodiment of the invention. The crystallized body demonstrates a deep white opacity even in cross sections as thin as 1/16 inch which is the result of the body having a total crystallinity in excess of 90% by weight wherein the individual crystals are essentially all smaller than about 0.5 micron in diameter.

I claim:

1. A glass-ceramic article essentially free from alkali metal oxides and the alkaline earth metal oxides MgO, CaO, and SrO which exhibits a coefficient of thermal expansion over the range 25°–900°C. of between about 0–25 × 10$^{-7}$/°C. and a dense white opacity in cross sections thinner than 1/8 inch, said dense opacity resulting from a crystal content greater than 75% by weight wherein said crystal content consists essentially of crystals having diameters not exceeding about 1 micron and being selected primarily from the group consisting of zinc petalite solid solution and beta-quartz solid solution, the composition of said article being substantially the same throughout and consisting essentially, by weight on the oxide basis, of about 10–20% ZnO, 10–20% Al$_2$O$_3$, 50–75% SiO$_2$, and at least 0.1% by weight of AgCl effective to nucleate said crystals.

2. A glass-ceramic article according to claim 1 also containing up to about 3% by weight P$_2$O$_5$.

3. A method for making a glass-ceramic article essentially free from alkali metal oxides and the alkaline earth metal oxides MgO, CaO, and SrO which exhibits a coefficient of thermal expansion over the range 25°–900°C. of between about 0–25 × 10$^{-7}$/°C. and a dense white opacity in cross sections thinner than 1/8 inch, said dense opacity resulting from a crystal content greater than 75% by weight wherein said crystal content consists essentially of crystals having diameters not exceeding about 1 micron and being selected primarily from the group consisting of zinc petalite solid solution and beta-quartz solid solution, which comprises the steps of:

a. melting a batch for a glass consisting essentially, by weight on the oxide basis, of about 10–20% ZnO, 10–20% Al$_2$O$_3$, 50–75% SiO$_2$, and at least 0.1% by weight of AgCl effective to nucleate said crystals;

b. simultaneously cooling the melt below the transformation range thereof and shaping a glass body therefrom;

c. thereafter subjecting said glass body to a temperature between about 775°–950°C. for a period of time sufficient to crystallize said glass body in situ throughout; and then d. cooling the crystallized body to room temperature.

4. A method according to claim 3 wherein said glass body is first exposed to a temperature between about 725°–800°C. for about 2–6 hours, thereafter subjected to a temperature between about 800°–950°C. for about 1–8 hours, and then cooled to room temperature.

5. A method according to claim 3 wherein said glass body also contains up to about 3% by weight P$_2$O$_5$.

* * * * *